US010859485B2

(12) United States Patent
Marra

(10) Patent No.: US 10,859,485 B2
(45) Date of Patent: Dec. 8, 2020

(54) PARTICLE SENSOR AND SENSING METHOD

(71) Applicant: KONINKLIJKE PHILIPS N.V., Eindhoven (NL)

(72) Inventor: Johan Marra, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 464 days.

(21) Appl. No.: 15/578,759

(22) PCT Filed: May 31, 2016

(86) PCT No.: PCT/EP2016/062231
§ 371 (c)(1),
(2) Date: Dec. 1, 2017

(87) PCT Pub. No.: WO2016/193246
PCT Pub. Date: Dec. 8, 2016

(65) Prior Publication Data

US 2018/0217046 A1 Aug. 2, 2018

(30) Foreign Application Priority Data

Jun. 5, 2015 (EP) .................................... 15170755

(51) Int. Cl.
*G01N 15/06* (2006.01)
*B03C 3/017* (2006.01)
(Continued)

(52) U.S. Cl.
CPC ......... *G01N 15/0656* (2013.01); *B03C 3/017* (2013.01); *B03C 3/12* (2013.01);
(Continued)

(58) Field of Classification Search
CPC ........ G01N 15/0656; G01N 2015/0046; B03C 3/38; B03C 3/49; B03C 3/41;
(Continued)

(56) References Cited

U.S. PATENT DOCUMENTS 7,836,751 B2 11/2010 Marra
7,857,892 B2 12/2010 Marra
(Continued)

FOREIGN PATENT DOCUMENTS

WO WO2012069963 A1 5/2012
WO WO2013132154 A1 9/2013

OTHER PUBLICATIONS

Marra J. et al., "Using the Aerasense NanoTracer for Simultaneously Obtaining Several Ultrafine Particle Exposure Metrics"; Journal of Physics, Conference Series 304 (2011) 012010.
(Continued)

*Primary Examiner* — Daniel S Larkin
*Assistant Examiner* — Anthony W Megna Fuentes

(57) ABSTRACT

A particle sensor includes an aperture for receiving a gas flow with entrained particles, an electrostatic particle charging section, a parallel-plate particle precipitation section; and a sensor for detecting precipitated particles to produce a sensor signal. The sensor signal $I_{sensor}$ is related to an apparent particle number concentration of the particles in the gas flow entering the charging section by a calibration constant $S_1$, such that $I_{sensor}=f(N_{app}, S_1)$, the calibration constant being dependent on a count mean diameter of the particles in the gas flow entering the charging section according to a first relationship. The particle sensor includes a pre-filter positioned upstream from the charging section, the pre-filter filtering a part of the particles from the gas flow entering the pre-filter, a fractional degree of particle filtering depending on the count mean particle diameter of the
(Continued)

particles entering the pre-filter according to a second relationship.

14 Claims, 4 Drawing Sheets

(51) Int. Cl.

| | |
|---|---|
| ***B03C 3/155*** | (2006.01) |
| ***B03C 3/36*** | (2006.01) |
| ***B03C 3/41*** | (2006.01) |
| ***B03C 3/49*** | (2006.01) |
| ***B03C 3/38*** | (2006.01) |
| ***G01N 15/00*** | (2006.01) |
| ***B03C 3/12*** | (2006.01) |

(52) U.S. Cl.
CPC .............. *B03C 3/155* (2013.01); *B03C 3/368* (2013.01); *B03C 3/38* (2013.01); *B03C 3/41* (2013.01); *B03C 3/49* (2013.01); *B03C 2201/06* (2013.01); *G01N 2015/0046* (2013.01)

(58) Field of Classification Search
CPC ........... B03C 3/368; B03C 3/155; B03C 3/12; B03C 3/017; B03C 2201/06
See application file for complete search history.

(56) References Cited

U.S. PATENT DOCUMENTS

| | | | |
|---|---|---|---|
| 8,402,815 | B2 | 3/2013 | Marra |
| 8,452,489 | B2 | 5/2013 | Marra |
| 8,607,616 | B2 | 12/2013 | Marra |
| 8,627,732 | B2 | 1/2014 | Marra |
| 8,627,733 | B2 | 1/2014 | Marra |
| 8,701,466 | B2 | 4/2014 | Marra |

OTHER PUBLICATIONS

Marra J. et al., "Nanoparticle Monitoring for Exposure Assessment"; IEEE Nanotechnology Magazine (Jun. 2009) pp. 6-12.
Marra J. et al., "Monitor for Detecting and Assessing Exposure to Airborne Nanoparticles"; Journal of Nanoparticle Research, Jan. 2010, vol. 12, Issue 1, pp. 21-37.
Marra J. "Airborne Particle Monitoring for an Enhanced Indoor Air Pollution Control"; Proc. Healthy Buildings Conf., Syracuse, USA (Sep. 2009); paper #195.

(a)

(b)

PARTICLE SENSOR AND SENSING METHOD

FIELD OF THE INVENTION

The invention relates to a particle sensor, in particular for determining the apparent particle number concentration (i.e. the apparent number of particles per unit volume) of airborne ultrafine particles ("UFP").

BACKGROUND OF THE INVENTION

A known particle sensor of this type typically comprises a means for establishing an airflow through the sensor (for example a ventilator or a pump). The airflow subsequently passes through a particle charging section having an ionization electrode for electrically charging airborne particles, and a particle precipitation section for removing substantially all airborne particles from the flow.

The sensor further comprises a particle measurement section having a current meter for measuring the electrical current ($I_{sensor}$) that results from the deposition of particle-bound charge per unit time in the particle precipitation section.

From the measured electrical current ($I_{sensor}$) a so-called apparent ultrafine particle number concentration ($N_{app}$) can be calculated based on the following equation:

$$N_{app}=S\cdot I_{sensor} \quad (1)$$

In the above equation, S represents a calibration constant. The apparent ultrafine particle number concentration ($N_{app}$) is equal to the ratio of the particle length concentration (i.e. the total length of the string of all airborne UFPs in a unit air volume when they would be lined up therein as a string) and a predetermined average particle diameter ($d_{p,av}$*). Here, the average particle diameter represents the arithmetic mean particle diameter, also known as the count mean particle diameter. For UFPs, Eq. (1) is valid independent of the value of $d_{p,av}$* when substantially all charged airborne particles are deposited in the particle precipitation section.

The particle precipitation section may comprise a mechanical particle filter disposed within a Faraday cage, or a parallel-plate electrostatic particle precipitator. From the point of view of manufacturability, the latter is preferred over the former. It is also desirable to use a sensor design with small dimensions. However, this choice only allows a partial precipitation of all charged airborne UFPs, particularly so at increasing UFP size. In particular, it is difficult to ensure that substantially all charged airborne particles will be removed from the sampled airflow, because this requires the application of a high particle precipitation voltage (more than 100 V, which is not attractive from an electronic point of view), and/or a small flow rate (less than 0.3 liters per minute, which reduces sensitivity), and/or a long precipitation length within the particle precipitator (which results in a large device size).

Consequently, when a parallel-plate electrostatic precipitator is used, it likely means that not all charged airborne particles will be removed from the sampled airflow and this prevents an unambiguous interpretation of $I_{sensor}$ in terms of $N_{app}$, particularly so when the count mean diameter $d_{p,av}$ of the sampled particles is unknown.

There is therefore a need for a particle sensor design in which a sensor current can be more correctly interpreted in terms of the particle length concentration, even without precipitating all charged particles from the sampled airflow in the sensor's particle precipitation section.

SUMMARY OF THE INVENTION

The invention is defined by the claims.

According to examples in accordance with an aspect of the invention, there is provided a particle sensor, comprising:

an input for receiving a gas flow with entrained particles;

an electrostatic particle charging section;

a parallel-plate particle precipitation section; and a sensor for detecting the precipitated particles to produce a sensor signal, wherein the sensor signal $I_{sensor}$ is related to the apparent particle number concentration $N_{app}$ of the particles in the gas flow entering the charging section by a calibration constant $S_1$, such that $I_{sensor}=f(N_{app}, S_1)$, which calibration constant $S_1$ is dependent on the count mean diameter $d_{p,av(cs)}$ of the particles in the gas flow entering the charging section according to a first relationship:

$$S_1=f_1(d_{p,av(cs)}),$$

wherein the particle sensor comprises a pre-filter positioned upstream from the charging section, the pre-filter being capable of filtering part of the particles from the gas flow entering the pre-filter, the fractional degree r of particle filtering depending on the count mean particle diameter $d_{p,av}$ of the particles entering the pre-filter according to a second relationship:

$$\eta=f_2(d_{p,av}), \text{ and}$$

wherein the pre-filter characteristics are such that the produced sensor signal in response to entrained particles which are not filtered out by the pre-filter relates to the apparent particle number concentration $N_{app}$ of the particles entering the pre-filter by a calibration constant S, which calibration constant S is dependent on the count mean diameter $d_{p,av}$ of the particles entering the pre-filter according to a third relationship:

$$S=f_3(d_{p,av}),$$

which third relationship is less dependent on the respective count mean diameter than the first relationship.

This sensor design makes use of a pre-filter to make the response of the overall sensor device (i.e. pre-filter, particle charging section and parallel-plate particle precipitation section) more independent of the specifics of the particle size distribution, since this size distribution information is generally not known. In this way, the undesired dependency of the sensor signal obtained from the precipitated charged particles in the parallel-plate precipitator on the particle size distribution at its input is at least partly compensated for, so that the sensor signal is less dependent (or not dependent at all) on the particle size distribution at the input of the overall sensor device. A calibration constant can then be used to correlate the sensor signal with the apparent particle number concentration in the sampled gas flow entering the input of the overall sensor device. By "less dependent" may be understood that there is made a shallower gradient of a best fit line to the function of the calibration value S with respect to the count mean particle diameter.

Approximations have to be used to characterise the pre-filter and sensor responses in order to attempt to at least partly remove the dependency of the sensor signal on the count mean particle diameter at any given value for the particle length concentration in the sampled gas flow. Thus, the dependency will generally not be removed completely. Preferably, over a range of count mean particle diameters $d_{p,av}$ of most interest (e.g. 25 nm to 100 nm), the maximum deviation from a constant value of a sensor conversion factor (earlier defined as the calibration constant S) is less than 25% and more preferably less than 15%. The dependency is less than in the said first relationship which exists in the absence of the pre-filter, and the aim is to remove this dependency on $d_{p,av}$ as much as possible, within physical limits which depend on the behaviour of the pre-filter and the particle precipitation section.

The first relationship can for example be approximated by a linear relationship:

$$S_1=A_1\cdot d_{p,av(cs)}+B_1 \quad (3)$$

in which $A_1$ and $B_1$ are positive constants which depend on the flow rate, the precipitation voltage, and the design of the parallel-plate particle precipitation section.

By testing the actual design of the parallel-plate precipitation section and then fitting this linear function, the parameters $A_1$ and $B_1$ may be found by experiment.

The pre-filter may comprise an activated carbon filter and it may have a volume of at least 1 ml per 0.1 liter/min sampled airflow.

The second relationship can for example be approximated by a power relationship:

$$\eta=\frac{A_2}{(d_{p,av})^{B_2}} \quad (4)$$

in which $A_2$ and $B_2$ are positive constants which depend on the characteristics of the pre-filter and the airflow speed through the pre-filter. By testing or modelling the pre-filter design and then fitting the results with this power relationship, the parameters $A_2$ and $B_2$ may be determined based on the design options chosen for the pre-filter.

The parallel-plate particle precipitation section, the pre-filter design and the operating airflow speed are preferably designed such that the calibration constant S given by the approximate function:

$$S=\frac{A_1 d_{p,av}+B_1}{1-\left(A_2 / d_{p,av}^{B_2}\right)} \quad (8)$$

reaches a minimum value within the range 25 nm≤$d_{p,av}$≤50 nm.

In this way, due to the presence of the pre-filter, the overall calibration constant S becomes less dependent on $d_{p,av}$ than the calibration constant $S_1$. The achieved dependency reduction results from the design specifics of the pre-filter in combination with the design of the parallel-plate precipitation section and the applied process conditions.

In accordance with another aspect of the invention, there is provided a method of designing a particle sensor, the method comprising the steps of:

designing an electrostatic particle charging section and a parallel-plate particle precipitation section;

selecting a sensor for detecting the precipitated particles to produce a sensor signal, wherein the sensor signal is related to the apparent particle number concentration $N_{app}$ of the particles entering the electrostatic charging section by a calibration constant $S_1$, such that $I_{sensor}$=f($N_{app}$, $S_1$), which calibration constant $S_1$ is dependent on the count mean diameter $d_{p,av(cs)}$ of the particles in the gas flow entering the charging section according to a first relationship:

$$S_1=f_1(d_{p,av(cs)}), \text{ and}$$

designing a pre-filter for positioning upstream from the charging section, and wherein the pre-filter has a second relationship between the fractional degree of particle deposition r within the pre-filter and the count mean diameter $d_{p,av}$ of the particles in the gas flow entering the pre-filter:

$$\eta=f_2(d_{p,av}),$$

wherein the method comprises selecting the pre-filter characteristics such that the sensor signal in response to entrained particles which are not filtered out by the pre-filter relates to the apparent particle number concentration $N_{app}$ of the particles entering the pre-filter by a calibration constant S, which calibration constant S is dependent on the count mean diameter $d_{p,av}$ of the particles entering the pre-filter according to a third relationship:

$$S=f_3(d_{p,av}),$$

which third relationship is less dependent on the respective count mean diameter than the first relationship.

As explained above, this design approach produces a sensor wherein the sensor signal obtained from the deposited charged particles in the parallel-plate precipitation section is less dependent on the particle size distribution at the input of the overall sensor device, preferably to the extent that, within an acceptable degree of accuracy, the details of the particle size distribution do not need to be taken into account.

In accordance with another aspect of the invention, there is provided a particle sensing method, comprising:

receiving a gas flow with entrained particles;

passing the gas flow through a pre-filter wherein the pre-filter has a pre-filter relationship between the fractional degree of particle deposition q within the pre-filter and the count mean particle diameter $d_{p,av}$ of the particles in the gas flow entering the pre-filter according to a second relationship:

$$\eta=f_2(d_{p,av});$$

passing the pre-filtered gas flow through an electrostatic particle charging section; and using a parallel-plate particle precipitation section, detecting the charge of the precipitated particles to produce a sensor signal, wherein the sensor signal is related to the apparent particle number concentration $N_{app}$ of the particles entering the electrostatic charging section by a calibration constant $S_1$, such that $I_{sensor}$=f($N_{app}$,$S_1$), which calibration constant is dependent on the count mean particle diameter $d_{p,av(cs)}$ of the particles entering the electrostatic charging section according to a first relationship:

$$S_1=f_1(d_{p,av(cs)}),$$

wherein the sensor signal in response to entrained particles which are not filtered out by the pre-filter relates to the apparent particle number concentration $N_{app}$ of the particles entering the pre-filter by a calibration constant S, which calibration constant S is less dependent on the count mean diameter $d_{p,av}$ of the particles entering the pre-filter according to a third relationship:

$$S=f_3(d_{p,av}),$$

which third relationship is less dependent on the respective count mean diameter than the first relationship.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a particle sensor, comprising an electrostatic particle charging section and a parallel-plate particle precipitation section, and a sensor for detecting the precipitated particles to produce a sensor signal. A pre-filter is placed before the charging section. The pre-filter characteristics are such that the sensor signal in response to entrained particles which are not filtered out by the pre-filter relates to the apparent particle number concentration $N_{app}$ at the particle sensor input by a calibration constant S which is less dependent on the count mean diameter $d_{p,av}$ of the particles in the gas flow entering the particle sensor than in the situation wherein no pre-filter is present. Thus, the dependency of the sensor signal derived from the precipitated particles in the precipitation section on the particle size distribution (caused by different degrees of particle precipitation at different particles sizes) is at least partly compensated for by a pre-filter possessing a suitable dependency of its particle filtering function on the particle size.

The design and operation of known electrical ultra-fine particle (UFP) sensors will first be described in more detail. These sensors for example measure particles in the particle size range between approximately 10 nm and 500 nm.

Figure 1:
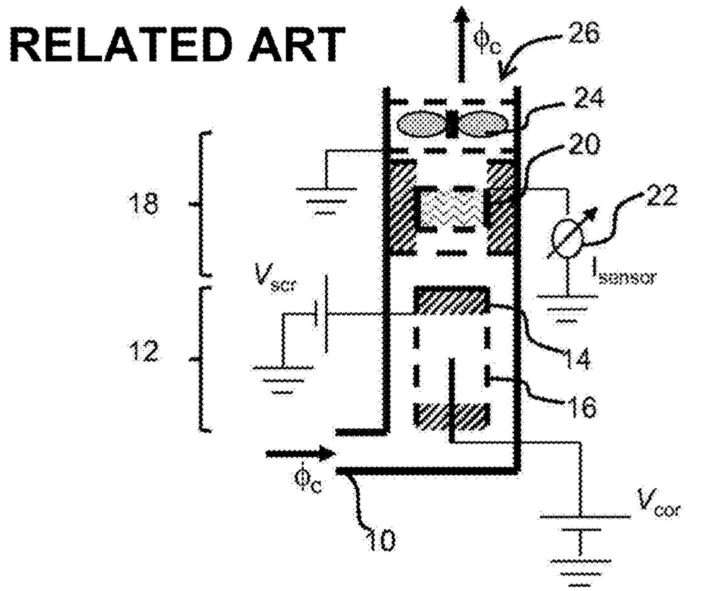
FIG. 1 shows a first example of a known particle sensor.

The most basic sensor implementation is shown in FIG. 1.

The sensor comprises an inlet 10 for receiving air at a flow rate c.

A UFP charging section 12 comprises an air-ionizing high voltage electrode 14 surrounded by a porous screen electrode 16.

Further downstream is a UFP precipitation section 18 comprising a Faraday cage 20 containing a particle filter that is capable of substantially filtering all airborne particles from the sampled airflow that passes through the UFP sensor.

A current meter 22 is connected to the Faraday cage. It measures the amount of particle-bound charge that deposits per unit time inside the Faraday cage as an electrical current $I_{sensor}$. $I_{sensor}$ constitutes the sensor signal.

There is a means 24 for moving a sampled airflow comprising the airborne UFPs through the sensor. This can be a ventilator, pump, or an ionic wind. There is an air flow outlet 26 which expels air at the flow rate $\phi_C$.

As mentioned above, the inferred apparent UFP number concentration $N_{app}$ in the sampled airflow relates to the measured $I_{sensor}$ according to:

$$N_{app}=S\cdot I_{sensor} \qquad (1)$$

This means that generally $I_{sensor}=f(N_{app},S)$.

S is a calibration constant, which is substantially independent of the specifics of the particle size distribution and thus substantially independent of the count mean UFP diameter $d_{p,av}$. Furthermore, the apparent particle number concentration $N_{app}$ is defined as:

$$N_{app}=\frac{Nd_{p,av}}{d^*_{p,av}} \qquad (2)$$

N is the total UFP number concentration, $d_{p,av}$ is the count mean particle diameter, and $d_{p,av}$* can be any pre-chosen default average particle diameter (usually $d_{p,av}=50$ nm).

Thus, $N_{app}$ is proportional to the product of N and $d_{p,av}$. The product $Nd_{p,av}$ denotes the particle length concentration ($m/m^3$). Knowledge of only $N_{app}$ is sufficient to assess the relative severity of the UFP-associated air pollution level. Separate knowledge of both N and $d_{p,av}$ is not required for that purpose.

Equation 2 is valid for an average UFP particle size range 25 nm$\le d_{p,av}\le$120 nm. This range encompasses the typically encountered UFP size distributions throughout the UFP diameter range 10 nm$\le d_p\le$500 nm.

Figure 2:
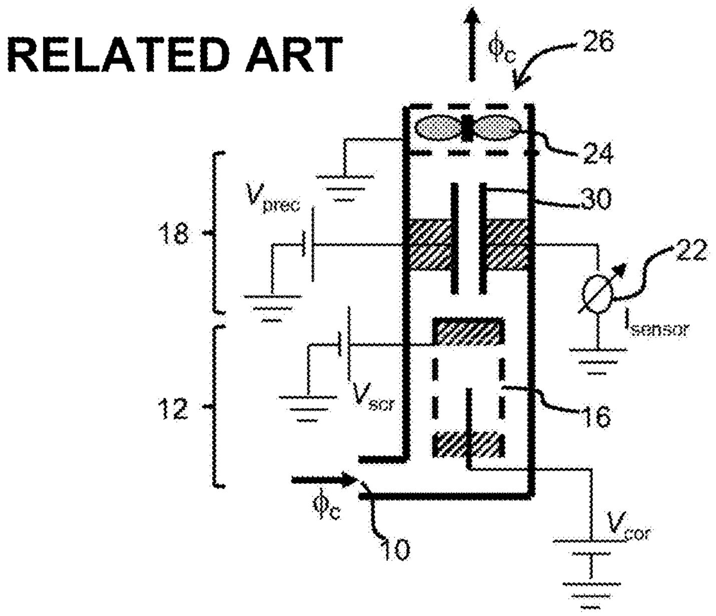
FIG. 2 shows a second example of a known particle sensor.

Instead of the UFP sensor embodiment shown in FIG. 1, an alternative embodiment in FIG. 2 can be used.

The same reference numbers are used as in FIG. 1 for the same components. Instead of the Faraday cage 20, a parallel-plate electrostatic particle precipitator 30 is provided and the current meter 22 is attached to the plate electrode whereupon the charged particles are precipitated. The parallel-plate precipitator can, for example, be embodied as two parallel flat electrode plates or as a concentric electrode set comprising an inner electrode that is surrounded by an outer electrode. Alternative embodiments will be apparent by the person skilled in the art.

Provided that all airborne charged UFPs precipitate, the above equations, Eqs. 1 and 2, still hold.

Use of the embodiment in FIG. 2 instead of the embodiment in FIG. 1 is preferred for ease-of-assembly reasons when UFP sensors are to be mass-produced at low cost and small size.

As mentioned above, when a parallel-plate electrostatic precipitator is used, it likely means that not all airborne particles will be removed from the sampled airflow and this prevents an unambiguous interpretation of $I_{sensor}$ in terms of $N_{app}$.

Figure 3:
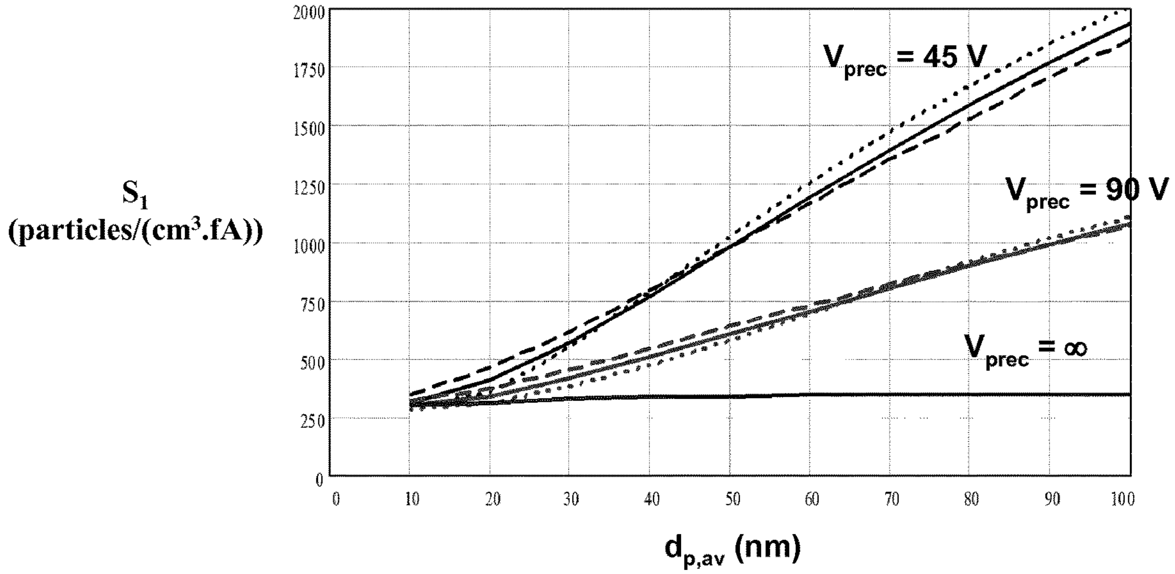
FIG. 3 shows how the calibration value $S_1$, which correlates the sensor signal in the design of FIG. 2 to the incident particle concentration, is dependent on the count mean diameter $d_{p,av}$ of the incident particles.
Figure 3:
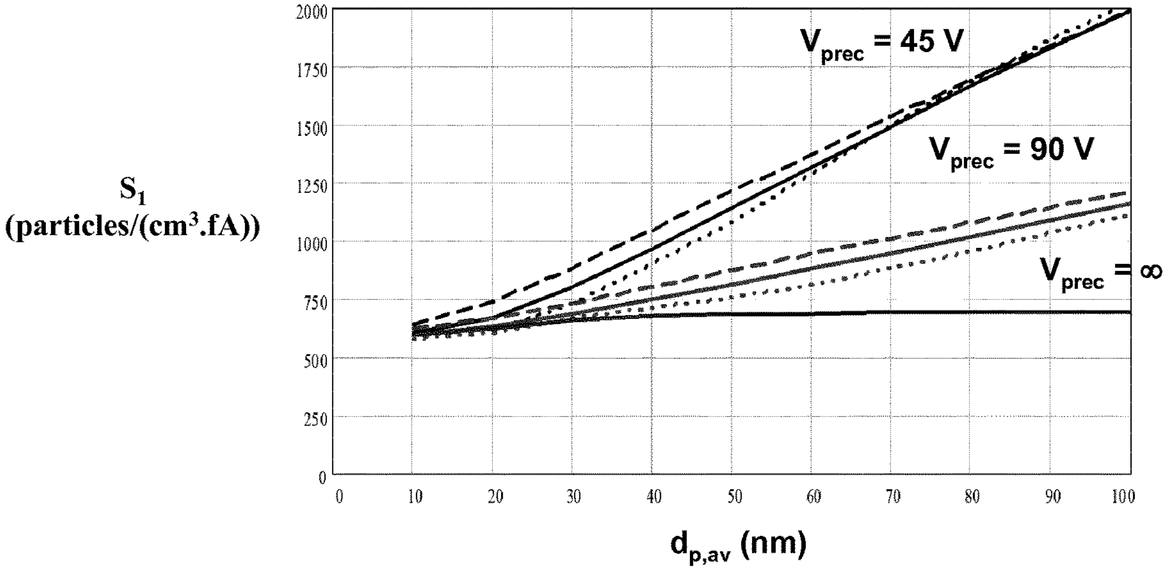

FIG. 3 shows examples of relationships between the calibration value $S_1$ and $d_{p,av}$ in equation 1 at different values of $\phi_C$ and $V_{prec}$ when only part of the airborne UFPs are precipitated in the sensor precipitation section. $V_{prec}$ is the voltage applied across the two parallel-plate electrodes facing each other.

All plots in FIG. 3(*a*) are for a flow rate of $\phi_C=0.6$ liter/min, but with three different values of $V_{prec}$ as shown. The infinite value of $V_{prec}$ relates to the ideal (but non-practical) situation wherein complete particle precipitation occurs and it gives the desired constant value of $S_1$ independent of $d_{p,av}$. The solid lines in FIGS. 3(*a*) and 3(*b*) hold for a log-normal particle size distribution with a standard deviation $\sigma=1.7$ in the width of the size distribution. The dashed lines hold for a log-normal particle size distribution with a standard deviation $\sigma=2.1$, while the dotted lines hold for a log-normal particle size distribution with a standard deviation $\sigma=1.3$. It is clear from FIG. 3(*a*) that $S_1$ is primarily a function of $d_{p,av}$ and substantially independent of $\sigma$.

All plots in FIG. 3(*b*) are for a flow rate $\phi_C=0.3$ liter/min, but with three different values of $V_{prec}$ as shown.

The values of $S_1$ in FIGS. 3(*a*) and 3(*b*) at finite $V_{prec}$ values are seen to be no longer constant for practical designs of the parallel-plate precipitator. This results from the incomplete precipitation of charged particles therein.

The invention is based on an investigation which has shown that, as a result of incomplete precipitation of particles, the calibration constant ($S_1$) becomes primarily dependent on the properties of the particle size distribution via the count mean particle diameter ($d_{p,av}$) according to a linear relationship:

$$S_1=A_1\cdot d_{p,av}+B_1 \tag{3}$$

The count mean particle diameter ($d_{p,av}$) is for the particles entering the sensor, i.e. the charging section of the sensor. Thus, to distinguish over the case where there are other components between the air inlet and the sensor, a count mean particle diameter ($d_{p,av(cs)}$) may be defined at the entry to the charging section, so that the calibration constant relates to the sensor alone.

Then:

$$S_1=A_1\cdot d_{p,av(cs)}+B_1 \tag{3a}$$

Generally, there is a first relationship relating to the sensor performance: $S_1=f_1(d_{p,av(cs)})$.

This linear relationship is seen in the examples of FIG. 3. This equation has been demonstrated to be valid at least in the range 25 nm$\leq d_{p,av}\leq$100 nm.

The numerical values of the positive constants $A_1$ and $B_1$ depend on the flow rate, the precipitation voltage, and the design specifics of the parallel-plate precipitator. They can either be calculated or determined experimentally.

Thus, the actual behaviour of the parallel-plate precipitation section can be approximated by equation 3.

Because for the particles entrained in a sampled airflow the count mean particle diameter ($d_{p,av}$) is typically not known, the calibration constant ($S_1$) is not known even when $A_1$ and $B_1$ are known, and the apparent ultrafine particle number concentration ($N_{app}$) cannot be reliably determined by only measuring the electrical current ($I_{sensor}$) that results from the deposition of particle-bound charge per unit time in the parallel-plate electrostatic particle precipitator.

The invention is based on at least partly compensating the effect explained above by including a filter upstream from the particle charging section, wherein the filter is arranged to remove a portion of the particles from the sampled airflow.

Figure 4:
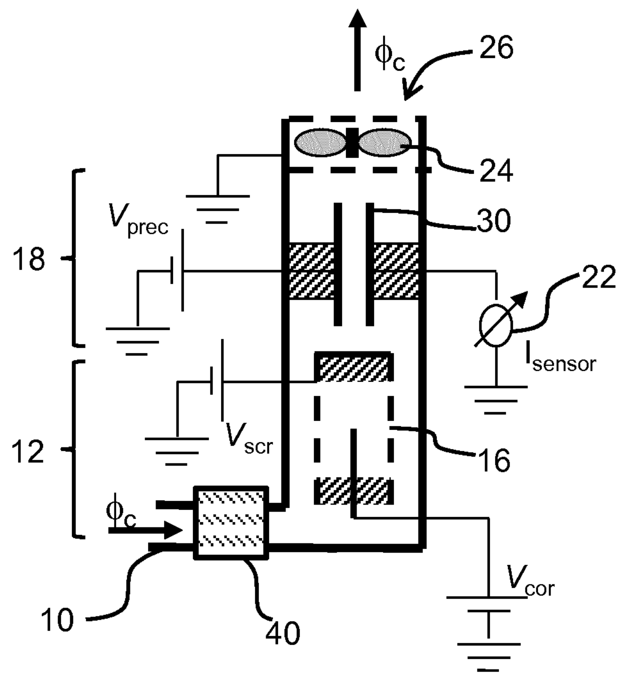
FIG. 4 shows a first example of a particle sensor in accordance with the invention.

An example of the sensor according to the invention is shown in FIG. 4. The design is the same as shown in FIG. 2 but with an activated carbon filter 40 at the inlet 10 of the sensor.

The installation of an appropriately designed activated carbon (AC) filter 40 upstream from the sensor charging section 12 helps to reduce the dependency of the calibration factor on the (generally unknown) count mean particle diameter as explained below.

Through physical adsorption, the AC filter is capable of removing silicone-containing gases from the sampled airflow before they reach the ionization electrode in the sensor's charging section. In addition, the AC filter removes part of the airborne UFPs from the sampled airflow through diffusional UFP deposition on the AC material. The fractional degree of UFP deposition r on granular AC material has been found to decrease with increasing count mean UFP diameter $d_{p,av}$ (of the particles entering the filter) according to a power relationship of the form:

$$\eta=\frac{A_2}{(d_{p,av})^{B_2}} \tag{4}$$

Generally, there is a second relationship $\eta=f_2(d_{p,av})$.

In the above equation, $\eta$ denotes the removed fraction of the particle length concentration by the filter as a function of the count mean diameter of the particles entering the filter.

The numerical values of the positive constants $A_2$ and $B_2$ depend on the characteristics of the filter and they can be determined experimentally.

In equation 4, $A_2$ and $B_2$ are positive constants whose values depend on the granule size of the AC filter, the superficial airflow speed v, through the AC filter, and the length of the AC filter.

Equation 4 was found to be valid in the range 25 nm$\leq d_{p,av}\leq$100 nm for values $\eta<0.8$.

Figure 5:
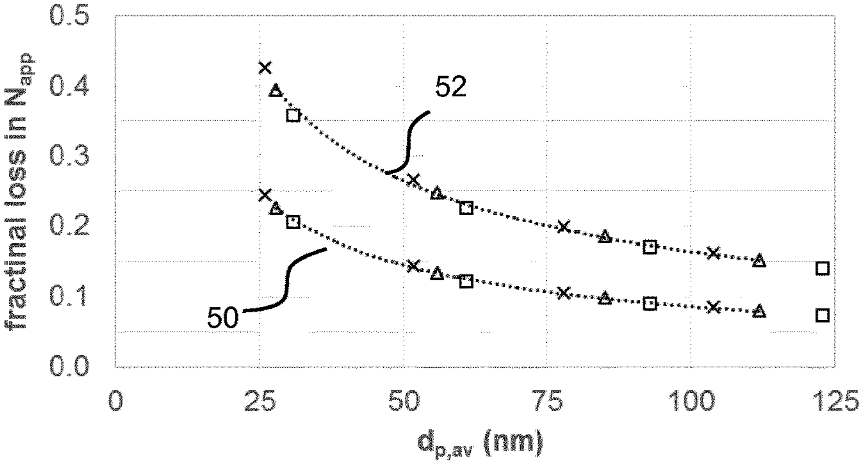
FIG. 5 shows examples of filtering relationships to be satisfied by the pre-filter in the particle sensor of FIG. 4.

Two examples of power fits to a set of fractional particle length deposition values in AC filters are shown in FIG. 5 as a plot of $\eta$ vs. $d_{p,av}$.

Plot 50 is for experimental filtering data obtained with an activated carbon bed length of 16 mm at a superficial airflow speed 0.025 m/s, the activated carbon bed comprising cylindrical carbon granules of 2 mm in diameter.

Plot 52 is for experimental filtering data obtained with an activated carbon bed length of 32 mm at a superficial airflow speed 0.025 m/s, the activated carbon bed comprising cylindrical carbon granules of 2 mm in diameter.

To enable an adequate and long-lasting removal of silicone-containing vapours from sampled air, the granular AC filter should preferably have a volume of at least 1 ml per 0.1 liter/min sampled airflow. Thus, when the sampled airflow is 0.4 liter/min, the activated carbon filter should have a volume of at least 4 ml. At the typical density $\rho_c=0.5$ gram/cm$^3$ of a granular AC bed, a 4 ml AC bed comprises approximately 2 grams of granular AC material.

By varying the AC filter diameter, the AC filter length and/or the AC granule size in the AC filter, the diffusional deposition of UFP particles in the AC filter can be tuned to requirements.

Because the diffusional UFP deposition in the AC filter follows Equation 4, the apparent UFP number concentration $N_{app,down}$ that exits the AC filter and then enters the UFP charging section relates to the UFP concentration $N_{app}$ in the sampled air at the input to the overall device according to:

$$N_{app,down}=N_{app}\cdot(1-\eta)=N_{app}\cdot\left[1-\frac{A_2}{(d_{p,av})^{B_2}}\right] \tag{5}$$

Subsequently, the concentration $N_{app,down}$ entering the sensor precipitation section gives rise to a sensor signal $I_{sensor}$ according to:

$$N_{app,down}=(A_1 d_{p,av(cs)}+B_1)\cdot I_{sensor} \tag{6}$$

Combining Equations (5) and (6) yields:

$$N_{app} = \left[\frac{A_1 d_{p,av(cs)} + B_1}{1 - \frac{A_2}{(d_{p,av})^{B_2}}}\right] \cdot I_{sensor} \quad (7)$$

Note that with a suitably designed pre-filter (for example cylindrical activated carbon granules that are at least 2 mm in diameter), only a minor difference remains between $d_{p,av(cs)}$ and $d_{p,av}$, so that $d_{p,av(cs)}$ can approximately be replaced by $d_{p,av}$. This yields:

$$N_{app} = \left[\frac{A_1 d_{p,av} + B_1}{1 - \frac{A_2}{(d_{p,av})^{B_2}}}\right] \cdot I_{sensor} \quad (7a)$$

The section in square brackets represents the effective calibration constant which is defined by a third relationship $S=f_3(d_{p,av})$.

By tuning the design of the AC filter in FIG. 4 in such a way that the effective calibration constant $$S = \frac{A_1 d_{p,av} + B_1}{1 - \frac{A_2}{(d_{p,av})^{B_2}}} \quad (8)$$

reaches a minimum value in the range 25 nm≤$d_{p,av}$≤50 nm, the calibration constant S in equation 8 becomes less dependent on $d_{p,av}$ than the dependency of $S_1$ on $d_{p,av(cs)}$ according to equation 3a.

The first relationship of equation (3a) above relates to the value $d_{p,av(cs)}$ of the particles entering the charging section. If not pre-filter is present, the value $d_{p,av(cs)}$ becomes equivalent to the value $d_{p,av}$ in the second and third relationships.

The benefit of the invention is based on the improvement of the dependency of S on $d_{p,av}$ in the presence of the pre-filter compared to in the absence of the pre-filter.

Figure 6:
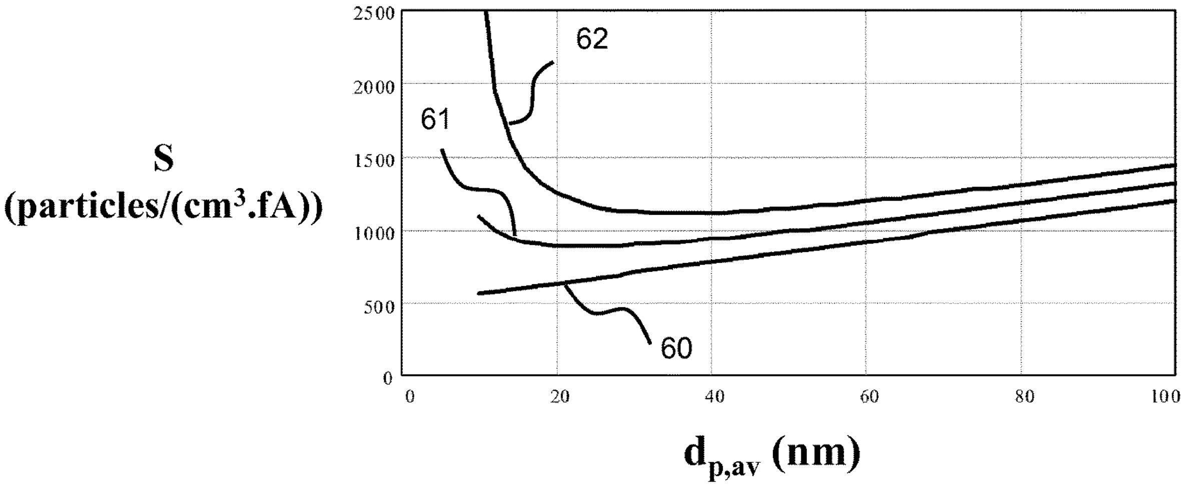
FIG. 6 shows examples of how the calibration constant S, which correlates the sensor signal in the particle sensor design of FIG. 4 to the concentration of the particles in the gas flow entering the particle sensor, becomes less dependent on the count mean diameter $d_{p,av}$ of the particles entering the particle sensor in relation to the design of the pre-filter comprised in the particle sensor.

The effect of the presence of different filters on the dependency of S on $d_{p,av}$ is illustrated in FIG. 6. Plot 60 gives the dependency of S on $d_{p,av}$ in the absence of the AC filter. S can then be represented by equation 3. Compared with plot 60, plot 61 illustrates the induced change in S when installing an AC filter upstream from the particle charging section with an activated carbon bed length of 16 mm. Sampled air at a superficial airflow speed 0.025 m/s is passed through this AC filter which comprises cylindrical carbon granules of 2 mm in diameter. It is observed from plot 61 that S reaches a minimum value at $d_{p,av}$=25 nm. Plot 62 is obtained when the length of the AC filter is increased to 32 mm, all other parameters remaining the same as in plots 60 and 61. In plot 62, S reaches a minimum value at $d_{p,av}$=35 nm. When calibrating the particle sensor with a test aerosol of UFP particles with $d_{p,av}$=50 nm, the thereby obtained (fixed) value for S in the presence of the 32 mm AC filter will be less than 20% in error when the particle sensor is subsequently used for determining the apparent particle number concentration $N_{app}$ for UFP size distributions having $d_{p,av}$ values in the range of 25 nm to 100 nm. This gives a more reliable estimate for $N_{app}$ across a broad range of $d_{p,av}$ values when compared with the situation represented by plot 60 in FIG. 6 wherein no filter is present upstream from the particle charging section.

A reduced dependency of S on $d_{p,av}$ can thus be achieved based on design of the AC bed in combination with the design of the UFP sensor and the process conditions existing in the UFP sensor, the relative dependency of S on $d_{p,av}$ becoming minimized when the minimum value for S is realized within the range 25 nm≤$d_{p,av}$≤50 nm.

When the dependency of S on $d_{p,av}$ is sufficiently reduced, equation 1 approximately holds again for the relationship between $I_{sensor}$ and $N_{app}$ even in the situation wherein only a portion of the UFPs precipitates in the precipitation section of the sensor.

The end result is that the pre-filter makes the response of the overall sensor device (i.e. pre-filter, charging section and parallel-plate precipitation section) substantially independent of the particle size distribution (as represented by the count mean particle diameter) at the overall device input. The undesired dependency of the sensor signal to the particle size distribution at its input is then largely compensated for. A single calibration constant can then be used to correlate the sensor signal to the apparent particle number concentration at the input of the overall sensor device.

The numerical values of $A_1$ and $B_1$ depend on the flow rate, the precipitation voltage, and the design specifics of the parallel-plate precipitator, while those of $A_2$ and $B_2$ depend on the characteristics of the pre-filter.

The approach of the invention also addresses another problem. In UFP sensor designs such as shown in FIG. 2, the ionizing tip of the HV ionization electrode in the charging section of the sensor gradually becomes coated with a white $SiO_2$ deposit when the sampled air comprises silanes of silicon-containing gases. These gases become oxidized in the plasma region around the ionizing electrode tip, thereby depositing $SiO_2$ residues onto the electrode. Because of the insulating nature of the $SiO_2$ material, the electrode's ionization behaviour becomes eventually disturbed, leading to sensor malfunctioning The pre-filter comprising activated carbon material removes gaseous compounds from the airflow before they reach the ionization electrode. Particularly the removal of silicone-containing gases prevents the formation of electrically-insulating silicon dioxide residues on the ionization electrode which would otherwise result in a reduction of the electrode functionality over time.

Thus, the sensitivity of the UFP sensor to disturbances induced by $SiO_2$ deposition on the ionizing electrode is substantially reduced by the pre-filtering when carried out with activated carbon in the pre-filter. The activated carbon material therein can be present as granules, as fibers, as particles coated on and in a foam support material, or as fine particles coated on a supporting sheet material.

Other suitable pre-filters also exist, for example a mechanical fibrous filter. Any particle filter can be used which can be designed to create the desired compensation function with respect to the number-averaged particle diameter, i.e. the relationships shown in FIG. 5.

The invention provides a particle sensor which has been designed in the manner explained above, a design method as explained above, and a particle sensing method using the particle sensor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A particle sensor, comprising: an input aperture for receiving a gas flow with entrained particles; an electrostatic particle charging section; a parallel-plate particle precipitation section, wherein the parallel-plate particle precipitation section has a plate aperture; and a sensor, wherein the sensor is arranged to detect precipitated particles to produce a sensor signal, wherein the sensor signal Isensor is related to an apparent particle number concentration $N_{app}$ of the particles in the gas flow entering the charging section by a calibration constant S1, such that Isensor=f($Na_{pp}$, S1), wherein the calibration constant S1 is dependent on a count mean diameter $d_{p,av(cs)}$ of the particles in the gas flow entering the charging section according to a first relationship:

$$S_1=f_1(d_{p,av(cs)})$$

wherein the particle sensor comprises a pre-filter positioned upstream from the charging section, wherein the pre-filter removes a portion of the particles from the gas flow entering the pre-filter, wherein a fractional degree η of particle filtering depends on the count mean particle diameter $d_{p,av}$ of the particles entering the pre-filter according to a second relationship:

$$\eta=f_2(d_{p,av})$$

wherein characteristics of the pre-filter are such that the produced sensor signal is in response to entrained particles which are not filtered out by the pre-filter relates to the apparent particle number concentration $N_{app}$ of the particles entering the pre-filter by a calibration constant S, wherein the calibration constant S is dependent on the count mean diameter $d_{p,av}$ of the particles entering the pre-filter according to a third relationship:

$$S=f_3(d_{p,av})$$

wherein the third relationship is less dependent on the respective count mean diameter than the first relationship for a range of count mean diameters 25 nm to 100 nm, such that the dependency of the sensor signal obtained from the parallel-plate precipitation section on a particle size distribution at the plate aperture is at least partly compensated for, such that the sensor signal is less dependent on the particle size distribution at the input aperture of the particle sensor.

2. The particle sensor as claimed in claim 1, wherein the first relationship is approximated by a linear relationship:

$$S_1=A_1\cdot d_{p,av(cs)}+B_1$$

wherein $A_1$ and $B_1$ are positive constants, wherein $A_1$ and $B_1$ depend on a gas flow rate, an applied particle precipitation voltage, and a design of the parallel-plate particle precipitation section.

3. The particle sensor as claimed in claim 2, wherein the second relationship is approximated according to a power relationship:

$$\eta=\frac{A_2}{(d_{p,av})^{B_2}}$$

wherein $A_2$ and $B_2$ are positive constants, wherein $A_2$ and $B_2$ depend on the characteristics of the pre-filter and a gas flow speed through the pre-filter.

4. The particle sensor as claimed in claim 3, wherein the pre-filter and the operating gas flow speed are arranged such that the calibration constant S given by the third relationship according to an approximate function $$S=\frac{A_1 d_{p,av}+B_1}{1-\frac{A_2}{(d_{p,av})^{B_2}}}$$

reaches a minimum value within a range of 25 nm≤$d_{p,av}$≤50 nm.

5. The particle sensor as claimed in claim 1, wherein the pre-filter comprises an activated carbon filter.

6. The particle sensor as claimed in claim 5, wherein the pre-filter has a volume of at least 1 ml per 0.1 liter/min of the sampled gas flow.

7. A method of designing a particle sensor, comprising: designing an electrostatic particle charging section and a parallel-plate particle precipitation section, wherein the parallel-plate particle precipitation section has a plate aperture; selecting a sensor for detecting the precipitated particles to produce a sensor signal, wherein the sensor signal is related to an apparent particle number concentration $N_{app}$ of the particles entering the electrostatic charging section by a calibration constant $S_1$, such that Isensor=f(Napp, S1), wherein the calibration constant S1 is dependent on a count mean diameter $d_{p,av}$(cs) of the particles in a gas flow entering the charging section according to a first relationship:

$$S_1=f_1(d_{p,av(cs)}), \text{ and}$$

designing a pre-filter for positioning upstream from the charging section, wherein the pre-filter has a second relationship between a fractional degree of particle deposition η within the pre-filter and the count mean diameter $d_{p,av}$ of the particles in the gas flow entering the pre-filter:

$$\eta=f_2(d_{p,av})$$

selecting characteristics of the pre-filter such that the sensor signal in response to entrained particles which are not filtered out by the pre-filter relates to the apparent particle number concentration $N_{app}$ of the particles entering the pre-filter by a calibration constant S, wherein the calibration constant S is dependent on the count mean diameter $d_{p,av}$ of the particles entering the pre-filter according to a third relationship:

$$S=f_3(d_{p,av})$$

wherein the third relationship is less dependent on the respective count mean diameter than the first relationship for a range of count mean diameters 25 nm to 100 nm, such that the dependency of the sensor signal obtained from the parallel-plate precipitation section on a particle size distribution at the plate aperture is at least partly compensated for, such that the sensor signal is less dependent on the particle size distribution at an input aperture of the particle sensor.

8. The method as claimed in claim 7, wherein the first relationship is approximated by a linear relationship:

$$S_1=A_1\cdot d_{p,av(cs)}+B_1$$

wherein $A_1$ and $B_1$ are positive constants, wherein $A_1$ and $B_1$ depend on a flow rate, a precipitation voltage, and a design of the parallel-plate precipitation section.

9. The method as claimed in claim 7, wherein the second relationship is approximated by a power relationship:

$$\eta = \frac{A_2}{(d_{p,av})^{B_2}}$$

wherein $A_2$ and $B_2$ are positive constants, wherein $A_2$ and $B_2$ depend on the characteristics of the pre-filter and an airflow speed through the pre-filter.

10. The method as claimed in claim 9, wherein the pre-filter and the operating airflow speed are arranged such that the calibration constant S given by the said third relationship according to an approximate function:

$$S = \frac{A_1 d_{p,av} + B_1}{1 - \frac{A_2}{(d_{p,av})^{B_2}}}$$

reaches a minimum value within a range 25 nm≤$d_{p,av}$≤50 nm.

11. A particle sensing method, comprising: receiving a gas flow with entrained particles at an input aperture of a particle sensor; passing the gas flow through a pre-filter, wherein the pre-filter has a pre-filter relationship between a fractional degree of particle deposition η within the pre-filter and a count mean particle diameter $d_{p,av}$ of the particles in the gas flow entering the pre-filter according to a second relationship:

$$\eta = f_2(d_{p,av});$$

passing the pre-filtered gas flow through an electrostatic particle charging section; and using a parallel-plate particle precipitation section to detect the charge of the precipitated particles to produce a sensor signal, wherein the parallel-plate particle precipitation section has a plate aperture, wherein the sensor signal is related to an apparent particle number concentration $N_{app}$ of the particles entering the electrostatic charging section by a calibration constant S1, such that Isensor=f($Na_{pp}$, S1), wherein the calibration constant is dependent on the count mean particle diameter $d_{pav}$(cs) of the particles entering the electrostatic charging section according to a first relationship:

$$S_1 = f_1(d_{p,av(cs)}),$$

wherein the sensor signal, in response to entrained particles which are not filtered out by the pre-filter, relates to the apparent particle number concentration $N_{app}$ of the particles entering the pre-filter by a calibration constant S, wherein the calibration constant S is less dependent on the count mean diameter $d_{p,av}$ of the particles entering the pre-filter according to a third relationship:

$$S = f_3(d_{p,av}),$$

wherein the third relationship is less dependent on the respective count mean diameter than the first relationship for a range of count mean diameters 25 nm to 100 nm, such that the dependency of the sensor signal obtained from the parallel-plate precipitation section on a particle size distribution at the plate aperture is at least partly compensated for, such that the sensor signal is less dependent on the particle size distribution at the input aperture of the particle sensor.

12. The method as claimed in claim 11, wherein the first relationship is approximated by a linear relationship:

$$S_1 = A_1 \cdot d_{p,av(cs)} + B_1$$

wherein $A_1$ and $B_1$ are positive constants, wherein $A_1$ and $B_1$ depend on a flow rate, a precipitation voltage, and a design of the parallel-plate particle precipitation section.

13. The method as claimed in claim 11, wherein the second relationship is approximated by a power relationship:

$$\eta = \frac{A_2}{(d_{p,av})^{B_2}}$$

wherien $A_2$ and $B_2$ are positive constants, wherein $A_2$ and $B_2$ depend on characteristics of the pre-filter and an airflow speed through the pre-filter.

14. The method as claimed in claim 13, wherein the pre-filter and the operating airflow speed are arranged such that the calibration constant S given by the said third relationship according to an approximate function:

$$S = \frac{A_1 d_{p,av} + B_1}{1 - \frac{A_2}{(d_{p,av})^{B_2}}}$$

reaches a minimum value within a range 25 nm≤$d_{p,av}$≤50 nm.

* * * * *